Figure 1:
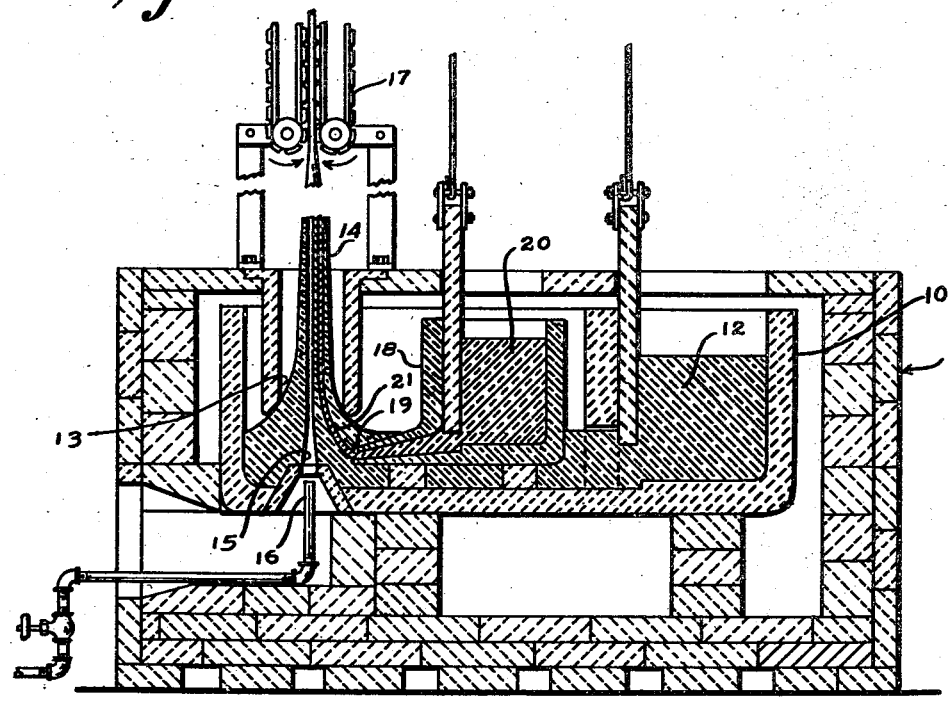

April 4, 1950     S. D. STOOKEY     2,503,140
GLASS TUBE AND COMPOSITION
Filed Aug. 25, 1945

Inventor
STANLEY DONALD STOOKEY
By Knight & Fowler
Attorneys

Patented Apr. 4, 1950

2,503,140

UNITED STATES PATENT OFFICE 2,503,140

GLASS TUBE AND COMPOSITION

Stanley Donald Stookey, Corning, N. Y., assignor to Corning Glass Works, Corning, N. Y., a corporation of New York Application August 25, 1945, Serial No. 612,617

1 Claim. (Cl. 49—92)

This invention relates to opal-striped glass tubing for thermometers and the like and to the opal glasses used for forming the light reflecting stripe or backing thereof.

It has long been customary to draw thermometer tubing vertically by mechanical means in order to avoid twisting the tube while it is being drawn. More recently there has been developed a continuous process, herein called the "updraw process," wherein a molten opacifiable glass from a small shaped orifice beneath the surface of a pool of molten clear glass is introduced into the body of a tube being continuously drawn vertically from another orifice located on the surface of the clear glass. The "updraw process" is advantageous and desirable to use for making thermometer tubing because of the increase in production and uniformity which can thereby be obtained.

In making opal striped tubing by the "updraw process" an opacifiable glass has been used which is clear or unopacified previous to drawing, that is, a glass having a liquidus below the drawing temperature, the liquidus being that temperature below which the opacifying particles will precipitate when the glass is slowly cooled. With prior glasses this condition has been necessary in order to avoid the objectionable growth of the opacifying particles which would occur if the liquidus of the glass were above the drawing temperature and the glass were maintained opacified prior to drawing, the drawing temperature ordinarily being about 1100° C. Hence, in the prior "updraw" process opacity "strikes" as the tubing is being drawn, but the glass during the draw is cooled relatively quickly before precipitation of the opacifying particles is complete. As a result the finished tubing undergoes an objectionable and non-uniform change in opacity when it is subsequently worked in a flame, as in the fabrication of thermometers. To aggravate the situation, it has been necessary, in order to obtain the desired opacity in the glass as drawn, to employ therein a greater amount of opacifying agent or agents than is necessary in the intermittent process wherein the glass is gathered by hand and cooled and reheated several times with consequent complete development of opacity before being drawn. A further difficulty arises when the finished tubes are finally annealed. Prior thermometer tubes made by the "updraw" process and having reflecting stripes of the requisite opacity warp and bend during annealing.

The primary object of this invention is to produce opal backed tubing by continuous vertical draw which will not undergo objectionable change in opacity when reheated nor warp during annealing.

Another object is to obtain maximum opacity or complete precipitation of the opacifying particles during draw.

Another object is to obtain maximum opacity with a minimum of opacifying agent.

Another object is to provide an opal glass which is suitable for the light reflecting stripe in thermometer tubing when the latter is produced by continuous vertical draw.

Another object is to provide an opal glass for continuous vertical tube drawing which will be opacified before being drawn and which will not appreciably change in opacity after being drawn.

Another object is to provide a light reflecting opal glass in which the light reflecting particles will not grow objectionably large when the glass is maintained for several hours at temperatures below its liquidus.

Another object is to provide an opal glass having a liquidus above 1200° C. in which there will be no objectionable growth of crystals when held for several hours at about 1100° C.

The above and other objects may be attained by practicing my invention which includes an opal backed tube and composition for producing it.

As has been pointed out above, it has heretofore been considered necessary in the production of opal backed tubing by the "updraw" process to employ an opal glass having a liquidus so low that the glass remains clear before being drawn. It has also been believed that an opal glass having a liquidus above the drawing temperature would be unsuitable and could not be used for this purpose, because in such a glass the opacifying particles would grow and form stones during the time in which it is necessary to maintain it at the drawing temperature prior to drawing it. This has been found to be true in the case of the prior arsenate and antimonate opals.

I have now found that a silicate glass, which is free from cadmium compounds and which contains zinc oxide and zinc sulfide equivalent to not over about 2% of sulfur as an opacifying agent, can be maintained for several hours without objectionable growth of large crystals in an opacified molten state at a temperature below its liquidus, provided that the molten glass is first rapidly cooled to a clear solidified state from a temperature above its liquidus and then remelted at the desired temperature below its liquidus, whereupon complete precipitation of excess zinc sulfide occurs. Under these conditions I have found that the particles of zinc sulfide do not grow objectionably. In this respect the new glass differs markedly from the fluoride opals and it is more surprising in that the additional introduction of fluorides into the batch does not cause crystallization or the growth of stones when the glass is remelted and maintained in a molten condition at a temperature below its opacified condition, provided that it is first cooled so rapidly from above its liquidus that precipitation of the opacifying particles is prevented. In other words, the new glasses containing as an opacifying agent zinc sulfide with or without fluorides are suitable for the purposes stated only when opacification is developed by remelting the clear unopacified glass. When opacification is developed by slowly cooling the glass from a temperature above its liquidus, a growth of large crystals may occur.

The new glass may also contain boric oxide, alumina, or oxides of other metals of the second periodic group, excepting cadmium, having an atomic weight not more than 138. The presence of cadmium is objectionable, because it causes the precipitation of cadmium sulfide particles which grow and form stones under these conditions. Although it would be expected that zinc sulfide under these conditions would behave in a manner similar to cadmium sulfide, I have found that this is not the case and that when zinc sulfide is precipitated from solution in a rapidly cooled glass by reheating the glass below its liquidus, no objectionable crystal growth occurs. However, if the zinc sulfide is precipitated by slowly cooling the glass from a temperature above its liquidus and maintaining it in a molten state below its liquidus, objectionable crystal growth will occur.

The opal glass made according to my invention is particularly suitable for the production of opal backed thermometer tubing and the like by the "updraw" process, because it has greater opacity than the prior glass, does not undergo any objectionable change in opacity when subsequently worked in a flame, and tubing so made does not warp during annealing.

In order that my invention may more easily be understood, reference is had to the accompanying drawing which illustrates my invention and in which Fig. 1 is a vertical sectional view of a portion of a device for the continuous vertical drawing of opal backed tubing in accordance with my invention.

Figure 2:
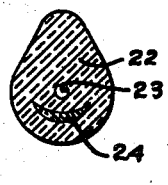
Figure 3:
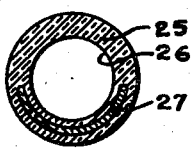

Fig. 2 is a transverse sectional view of a thermometer tube made in accordance with my invention; and Fig. 3 is a transverse sectional view of a modified tube having exaggerated wall thickness which is suitable for burettes made in accordance with my invention.

Referring to Fig. 1 in detail, a refractory container 10 is supported within a furnace 11 and contains a pool of molten clear glass 12 and a tube drawing orifice 13 through which a tube 14 provided with a bore 15 from an air jet 16 is continuously drawn by caterpillar traction means 17. Supported within the container 10 a smaller refractory container 18 is provided with a shaped orifice 19 which is below the surface of the glass 12. Within the container 18 molten opacified glass 20 containing zinc sulfide as an opacifying agent issues as the stripe 21 from the shaped orifice 19 adjacent the bore 15.

In Fig. 2 a thermometer tube of clear glass 22 is provided with a bore 23 and an opacified light reflecting stripe 27 adjacent the bore.

In Fig. 3 a burette tube of clear glass 25 is provided with a bore 26 and an opacified light reflecting strip 27 adjacent the bore.

In practicing the new method a suitable clear glass, preferably in a molten condition, is introduced into the container 10, which is heated at about 1100° C., to form the pool of glass 12. The new glass containing zinc sulfide as an opacifying agent and having a liquidus above 1200° C., examples of which will hereinafter be shown, is melted in the usual manner in a small tank furnace and is then rapidly cooled, as by ladling it out onto a cold surface to form unopacified cullet. The latter is introduced into the container 18 wherein it is remelted and held also at about 1100° C. This temperature being below the liquidus of the glass, the zinc sulfide is precipitated and the glass is thereby opacified. The opacified glass is continuously drawn into the stripe 21 in the tube 14, as described above.

The following batches in parts by weight are examples of opal glasses which will contain zinc sulfide as opacifying agent and which are illustrative of my invention.

|  | 1 | 2 | 3 | 4 | 5 | 6 |
|---|---|---|---|---|---|---|
| $SiO_2$ | 300 | 306 | 306 | 306 | 320 | 320 |
| $Na_2CO_3$ | 103 | 95 | 95 | 95 | 117 | 115 |
| ZnO | 82 | 20 | 20 | 40 | 66 | 53 |
| $Al(OH)_3$ | 14 | 5 | 5 | 5 | 11 | 11 |
| S | 6 | 6 | 6 | 8 | 8 |  |
| ZnS |  |  |  |  |  | 27 |
| C | 10 | 10 | 10 | 10 | 10 | 5 |
| $Na_2SiF_6$ | 20 | 20 | 20 | 20 | 11 | 11 |
| $CaCO_3$ |  |  | 91 | 109 |  | 25 |
| $BaCO_3$ |  |  |  |  | 54 |  |
| $H_3BO_3$ |  |  |  |  | 48 |  |

It will be noted that the above batches contain substantial amounts of zinc oxide and also sulfur or zinc sulfide. Although zinc sulfide per se may be added to the batch, as in batch 6, it is preferable to use sulfur and zinc oxide which combine during melting, because commercial zinc sulfide usually contains substantial amounts of lead sulfide and iron sulfide which discolor the glass. Compounds of beryllium, magnesium, and strontium may be used in lieu of $CaCO_3$ and $BaCO_3$ in the above batches. The presence of a substantial excess of zinc oxide prevents the slight discoloration which otherwise might be caused by the small unavoidable amounts of iron impurity which are derived from the other batch constituents and the refractory. Therefore, the glass should contain zinc equivalent to at least 5% ZnO. Some of the sulfur will be volatilized or oxidized or otherwise dissipated during melting and consequently the amount of zinc sulfide in the finished glass is always less than the equivalent of the sulfur in the batch. It is therefore necessary to use somewhat of an excess of sulfur in the batch. The use of carbon is advantageous for keeping oxidation losses at a minimum, the carbon being eliminated during melting. The amount of sulfur which is available for forming zinc sulfide during melting will also depend upon the conditions under which the batch is melted, that is, the temperature of melting, the type of melting container whether open or closed, etc. The actual amount of zinc sulfide in the finished glass cannot, therefore, be accurately estimated except by analysis. In the absence of anions.

such as cadmium, which would preferentially combine with the sulfur, the latter, to the extent that it is present in the finished glass, is probably entirely combined with zinc to form zinc sulfide.

By calculation, the percentages of sulfur which would theoretically be available for the formation of zinc sulfide in the finished glasses corresponding to the above batches, provided none were lost or otherwise dissipated or combined during melting, would be as follows:

Batch 1—1.3% S
Batch 2—1.3% S
Batch 3—1.3% S
Batch 4—1.7% S
Batch 5—1.6% S
Batch 6—1.9% S In other words, the maximum possible amounts of zinc sulfide in the finished glasses would theoretically be equivalent to the above state percentages of sulfur as calculated from the respective batches. It will be noted that the amount of combined sulfur in the glass does not exceed 2% S.

I have found that the batch must contain the equivalent of at least .5% of sulfur but not more than about 2% of sulfur for best results. Less than .5% will not develop a sufficiently dense opal and more than about 2% may cause the formation of stones in the glass, provided that the amount of zinc oxide is not exceedingly large. Extremely large amounts of zinc oxide appear to increase the solubility of the zinc sulfide in the glass and to prevent its precipitation. When the zinc oxide per se exceeds about 20%, the amount of sulfur required in the batch will exceed 2%.

Analysis of the glass which results from melting batch 1 in a day tank for about 20 hours at about 1450° C. shows that it contains zinc sulfide equivalent to 0.77% of sulfur.

The glasses corresponding to the above batches have liquidi which are above 1200° C. and, when rapidly cooled to a substantially clear solidified state and remelted at about 1100° C., they form dense opal glasses which are particularly suitable for the fabrication of opal-striped tubing by the "updraw" process. They develop maximum opacity before being drawn without objectionable crystal growth. Batch 1 is particularly suitable for the fabrication of thermometer tubing when combined with a clear glass having the following approximate composition

| | Percent |
|---|---|
| $SiO_2$ | 61 |
| $R_2O$ | 12 |
| PbO | 24 |
| $Al_2O_3$ | 3 |
| $B_2O_3$ | Trace |

The thermal expansion coefficients of these two glasses are substantially alike and for other combinations the same condition may be obtained by suitable adjustment of composition as is well known to those skilled in the art.

The term "alkali-zinc-silicate glass," as used in the claim, means a glass prepared by fusion of raw glass-making materials containing on the oxide basis a major proportion of silica, a minor proportion of an alkali metal oxide such as sodium oxide, and a minor proportion of zinc oxide, preferably containing a minor proportion of alumina, optionally containing a minor proportion of a fluoride, and, if desired, containing a minor proportion of boric oxide or an oxide of another metal other than cadmium of the second periodic group such as calcium or barium, but being free from compounds of cadmium.

I claim:

A glass tube having a wall composed of clear glass containing a layer of light-reflecting opaque glass substantially parallel to the bore of the tube, said opaque glass consisting essentially of an alkali-zinc-silicate glass opacified by particles of zinc sulfide and containing on the oxide basis as calculated from its batch from 5% to 20% ZnO and from 0.5% to 2% of sulfur computed as S.

STANLEY DONALD STOOKEY.

REFERENCES CITED

The following references are of record in the file of this patent:

UNITED STATES PATENTS

| Number | Name | Date |
|---|---|---|
| 686,009 | Wade | Nov. 5, 1901 |
| 1,696,400 | Hespe | Dec. 25, 1928 |
| 1,767,923 | Githler | June 24, 1930 |
| 1,920,336 | Woods | Aug. 1, 1933 |
| 1,995,952 | Taylor | Mar. 26, 1935 |
| 2,230,199 | Dobrovolny | Jan. 28, 1941 |
| 2,416,392 | Hood | Feb. 25, 1947 |

FOREIGN PATENTS

| Number | Country | Date |
|---|---|---|
| 415,536 | Great Britain | 1934 |

Certificate of Correction

Patent No. 2,503,140                                                                        April 4, 1950

STANLEY DONALD STOOKEY

It is hereby certified that errors appear in the printed specification of the above numbered patent requiring correction as follows:

Column 4, line 5, for "stripe 27" read *stripe 24*; line 8, for the word "strip" read *stripe*;

and that the said Letters Patent should be read with these corrections therein that the same may conform to the record of the case in the Patent Office.

Signed and sealed this 18th day of July, A. D. 1950.

[SEAL]

JOE E. DANIELS,
                                                                           *Assistant Commissioner of Patents.*